(12) United States Patent
Matsuura

(10) Patent No.: US 9,946,112 B2
(45) Date of Patent: Apr. 17, 2018

(54) LIGHT SOURCE APPARATUS EMITTING LIGHT FROM AN EMISSION SURFACE AND IMAGE DISPLAY APPARATUS HAVING THE LIGHT SOURCE APPARATUS

(71) Applicant: CANON KABUSHIKI KAISHA, Tokyo (JP)

(72) Inventor: Yasuhiro Matsuura, Yokohama-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 14/690,066

(22) Filed: Apr. 17, 2015

(65) Prior Publication Data

US 2015/0300576 A1 Oct. 22, 2015

(30) Foreign Application Priority Data

Apr. 21, 2014 (JP) ................................. 2014-087433
Feb. 17, 2015 (JP) ................................. 2015-028661

(51) Int. Cl.
*G02F 1/00* (2006.01)
*G02F 1/1335* (2006.01)

(52) U.S. Cl.
CPC .. *G02F 1/133603* (2013.01); *G02F 1/133606* (2013.01); *G02F 2001/133614* (2013.01)

(58) Field of Classification Search
CPC ......... G02F 1/133611; G02F 1/133609; G02F 1/133608; G02F 1/133602–1/133606
See application file for complete search history.

(56) References Cited

U.S. PATENT DOCUMENTS

2004/0062040 A1* 4/2004 Blume ................... G02B 27/01 362/231
2010/0187975 A1* 7/2010 Tsukahara ............ G02B 6/0038 313/503

(Continued)

FOREIGN PATENT DOCUMENTS

| JP | 2009-140829 A | 6/2009 |
| JP | 2010-251213 A | 11/2010 |
| JP | 2012-022028 A | 2/2012 |

OTHER PUBLICATIONS

The above foreign patent document was cited in the Feb. 16, 2016 Japanese Office Action, which is enclosed without an English Translation, that issued in Japanese Patent Application No. 2015-028661.

*Primary Examiner* — Sean Gramling
*Assistant Examiner* — Gerald J Sufleta, II
(74) *Attorney, Agent, or Firm* — Cowan, Liebowitz & Latman, P.C.

(57) ABSTRACT

A light source apparatus includes: a plurality of light sources provided, respectively, in a plurality of first divided regions; a first suppressing member that suppresses, for each of the plurality of first divided regions, spreading of light emitted from a light source provided in the first divided region; a conversion member that converts the color of the light emitted from the light sources and emits light of the converted color; and a diffusing member that is provided on a side closer to the emission surface than the conversion member so as to diffuse the light emitted from the conversion member, wherein the diffusing member is apart from the conversion member by a predetermined distance.

17 Claims, 9 Drawing Sheets

(56) References Cited

U.S. PATENT DOCUMENTS

2010/0246160 A1* 9/2010 Ito ..................... G02F 1/133603
                                                        362/84
2011/0292302 A1* 12/2011 Park ......................... F21K 9/60
                                                        348/739
2015/0323711 A1* 11/2015 Bessho ................ G02B 5/0242
                                                        349/71

\* cited by examiner

LIGHT SOURCE APPARATUS EMITTING LIGHT FROM AN EMISSION SURFACE AND IMAGE DISPLAY APPARATUS HAVING THE LIGHT SOURCE APPARATUS

BACKGROUND OF THE INVENTION

Field of the Invention

The present invention relates to a light source apparatus and an image display apparatus.

Description of the Related Art

Conventionally, a light source apparatus that includes a B-LED and a conversion member having an R phosphor and a G phosphor has been proposed as a backlight apparatus for liquid-crystal display apparatuses. The B-LED is a light-emitting diode (LED) that emits blue light. The R phosphor is a phosphor that emits red light by being excited with blue light. The G phosphor is a phosphor that emits green light by being excited with blue light. In such a light source apparatus, when blue light is emitted from the B-LED, red light is emitted from the R phosphor and green light is emitted from the G phosphor. The blue light from the B-LED, the red light from the R phosphor, and the green light from the G phosphor are combined to form combined light which is emitted from the light source apparatus. The use of such a light source apparatus enables light having a wide color gamut to be obtained as light emitted from the light source apparatus.

Such a light source apparatus has a problem in that, since the excited light (the blue light emitted from the B-LED) enters at various incidence angles in relation to the conversion member, a brightness unevenness or a color unevenness occurs in the light emitted from the light source apparatus. Japanese Patent Application Publication No. 2009-140829, for example, disclosed a technique for solving this problem. The technique disclosed in Japanese Patent Application Publication No. 2009-140829 uses a light beam control element that bends the light from an LED in a direction vertical to a light-emitting surface of a conversion member (phosphor layer).

Moreover, in recent years, quantum dots have been proposed as phosphors (wavelength conversion elements) capable of generating highly pure light by being excited. A quantum dot is a phosphor that emits light of color corresponding to the size of the quantum dot by reacting to ultraviolet light or blue light. Since the use of quantum dots enables red light or green light having a half-value width of approximately 40 nm to be obtained from blue light, it is possible to obtain light having a higher color gamut as the light emitted from the light source apparatus. Japanese Patent Application Publication No. 2012-022028, for example, discloses a light source apparatus which uses quantum dots. In the technique disclosed in Japanese Patent Application Publication No. 2012-022028, a sheet-shaped member (quantum-dot sheet) that contains quantum dots is used as a conversion member.

Moreover, local dimming control is proposed as a technique related to a backlight apparatus. In local dimming control, the emission brightness of a plurality of light sources (LEDs) provided in a plurality of divided regions that constitutes a screen region is controlled individually, whereby the emission brightness of a backlight apparatus is changed partially. For example, in the local dimming control, for each of the plurality of divided regions, a brightness value of image data to be displayed in the divided region is analyzed, and the emission brightness of a light source provided in the divided region is controlled based on an analysis result of brightness values. By performing local dimming control, it is possible to increase the contrast of a display image (the image displayed on the screen).

However, in the light source apparatus having the conversion member, light is emitted from a phosphor in various directions. Due to this, light emitted from the phosphor in a certain divided region leaks to another divided region, and a brightness unevenness or a color unevenness occurs in the light emitted from the light source apparatus. Such a brightness unevenness or such a color unevenness appears more remarkable when local dimming control is executed. Moreover, it is difficult to suppress such a brightness unevenness or such a color unevenness even when the conventional technique is applied.

SUMMARY OF THE INVENTION

The present invention provides a technique capable of better suppressing a brightness unevenness or a color unevenness of the light emitted from a light source apparatus having a conversion member that converts the color of light emitted from a plurality of light sources.

The present invention in its first aspect provides a light source apparatus that emits light from an emission surface, comprising:

a plurality of light sources provided, respectively, in a plurality of first divided regions of the emission surface;

a first suppressing member that suppresses, for each of the plurality of first divided regions, spreading, in a direction parallel to the emission surface, of light emitted from a light source provided in the first divided region;

a conversion member that is provided on a side closer to the emission surface than the plurality of light sources and the first suppressing member so as to convert the color of the light emitted from the plurality of light sources and emit light of the converted color; and a diffusing member that is provided on a side closer to the emission surface than the conversion member so as to diffuse the light emitted from the conversion member, wherein the diffusing member is apart from the conversion member by a predetermined distance.

The present invention in its second aspect provides an image display apparatus comprising:

the light source apparatus; and a display unit that displays an image on a screen by transmitting light from the light source apparatus.

According to the present invention, it is possible to better suppress a brightness unevenness or a color unevenness of the light emitted from a light source apparatus having a conversion member that converts the color of light emitted from a plurality of light sources.

Further features of the present invention will become apparent from the following de script ion of exemplary embodiments with reference to the attached drawings.

DESCRIPTION OF THE EMBODIMENTS

First Embodiment

Hereinafter, a light source apparatus and an image display apparatus according to a first embodiment of the present invention will be described.

A light source apparatus according to the present embodiment can be used as a light source apparatus of an image display apparatus including a display unit that displays an image on a screen by transmitting light from the light source apparatus, for example. Specifically, the light source apparatus according to the present embodiment can be used as a light source apparatus of an image display apparatus such as a liquid-crystal display apparatus, an advertisement display apparatus, or a sign display apparatus. The light source apparatus according to the present embodiment can be also used as a light source apparatus of an image display apparatus which uses display elements (for example, a micro-electro mechanical system (MEMS) shutter) other than a liquid-crystal element. Moreover, the light source apparatus according to the present embodiment can be also used as a light source apparatus of apparatuses (an indoor lighting or a street lamp) other than the image display apparatus.

Figure 1:
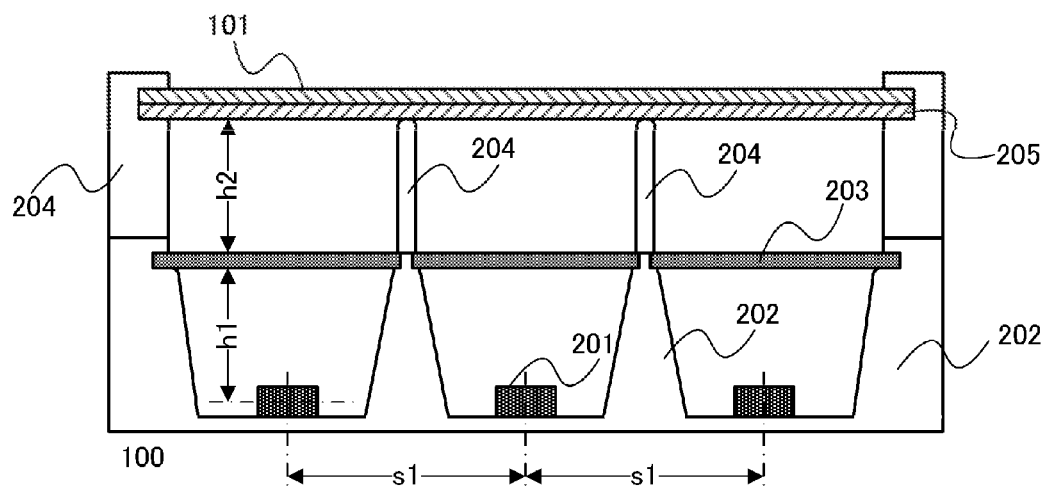
FIG. 1 is a cross-sectional view illustrating an example of a configuration of a liquid-crystal display apparatus according to a first embodiment.

FIG. 1 is a cross-sectional view (side view) illustrating an example of a configuration of a liquid-crystal display apparatus 100 according to the present embodiment. FIG. 1 is a cross-sectional view taken along a plane vertical to the screen of the liquid-crystal display apparatus 100.

The liquid-crystal display apparatus 100 includes a liquid-crystal panel 101 and a light source apparatus. The light source apparatus includes a plurality of light sources 201, a first suppressing member 202, a conversion member 203, a second suppressing member 204, a diffusing member 205, and the like.

The light source apparatus according to the present embodiment emits light from an emission surface. In the example of FIG. 1, a surface of the diffusing member 205 close to the liquid-crystal panel 101 corresponds to the emission surface.

The liquid-crystal panel 101 is a display unit that displays an image on a screen by transmitting light from the light source apparatus. The liquid-crystal panel 101 includes a plurality of liquid-crystal elements of which the transmittance is controlled in accordance with image data output from an image output apparatus. When light from the light source apparatus passes through the liquid-crystal panel 101 (the respective liquid-crystal elements) at transmittance corresponding to the image data, an image is displayed on the screen. In the example of FIG. 1, a surface of the liquid-crystal panel 101 on the opposite side of the diffusing member 205 corresponds to the screen. In the example of FIG. 1, the screen region is identical to the region of the emission surface.

The screen region may be different from the region of the emission surface.

The plurality of light sources 201 is provided in a plurality of first divided regions that constitutes the region of the emission surface. In the present embodiment, an example in which a B-LED which is a light-emitting diode (LED) that emits blue light is used as the light source 201 will be described. The light emitted from the plurality of light sources 201 is used as excitation light of the conversion member 203.

The light-emitting elements included in the LED 201 are not limited to LEDs. For example, a laser element, an organic EL element, a cold-cathode tube element, a plasma element, and the like may be used as the light-emitting elements.

The light emitted from the light source 201 is not limited to blue light. For example, the light emitted from the light source 201 may be red light, green light, cyan light, magenta light, yellow light, ultraviolet light, and the like.

One light source 201 may include one light-emitting element and may include a plurality of light-emitting elements.

The first suppressing member 202 suppresses, for each of the plurality of first divided regions, spreading, in a direction parallel to the emission surface, of the light emitted from the light source 201 provided in the first divided region. In the present embodiment, for each of the plurality of first divided regions, the light emitted from the light source 201 provided in the first divided region is reflected, whereby spreading, in the direction parallel to the emission surface, of the light emitted from the light source 201 provided in the first divided region is suppressed. Specifically, the first suppressing member 202 has, for each of the plurality of first divided regions, a surface that follows the outline of the first divided region. For each of the plurality of first divided regions, the light emitted from the light source 201 provided in the first divided region is reflected on the surface that follows the outline of the first divided region. In the example of FIG. 1, the first suppressing member 202 holds the conversion member 203 in an edge portion of the emission surface.

Figure 2:
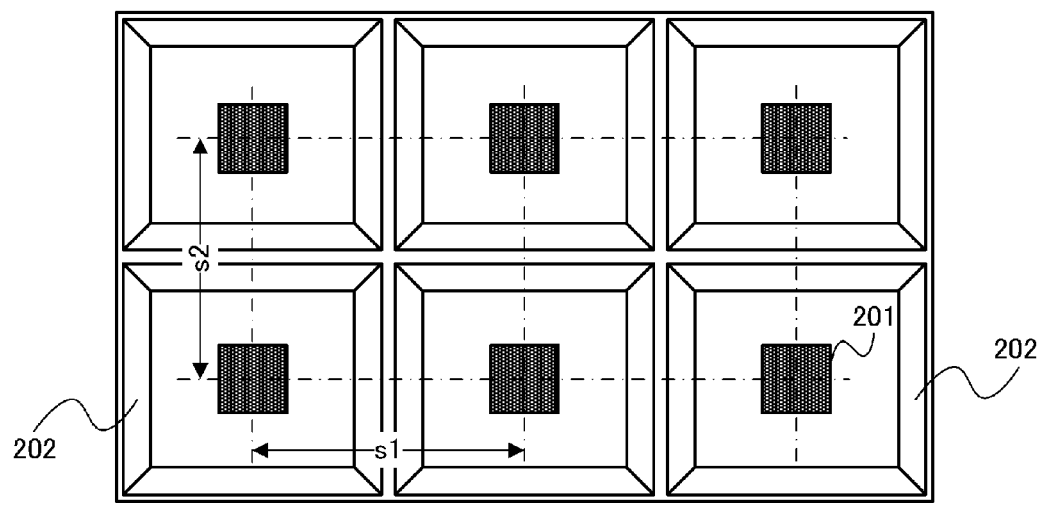
FIG. 2 is a top view illustrating a plurality of light sources and a first suppressing member according to the first embodiment.

FIG. 2 is a top view when the plurality of light sources 201 and the first suppressing member 202 are seen from the emission surface. FIGS. 1 and 2 illustrate an example in which the plurality of first divided regions includes six regions of two rows by three columns. In the example of FIGS. 1 and 2, the first suppressing member 202 has six depressed portions corresponding to the six first divided regions. Moreover, six light sources 201 are provided in the respective six depressed portions. In the present embodiment, the light emitted from the light source 201 is reflected from a side surfaces of the depressed portion. The light emitted from the light source 201 is also reflected on a bottom surface of the depressed portion.

In the present embodiment, spreading, in the direction parallel to the emission surface, of the light emitted from the light source 201 is suppressed, whereby a variation in the incidence angle of the light entering from the light source 201 to the conversion member 203 can be reduced. As a result, it is possible to suppress an unevenness (a brightness unevenness or a color unevenness of the light emitted from the light source apparatus) resulting from the variation in the incidence angle of the light entering from the light source 201 to the conversion member 203.

The plurality of first divided regions (light sources 201) may not be disposed in a matrix form. For example, the plurality of first divided regions may be disposed in a staggered grid form and may be arranged in one direction.

The shape of the first divided region is not particularly limited. For example, the shape of the first divided region may be square, rectangular, parallelogrammic, trapezoidal, triangular, pentagonal, circular, or the like.

The size of the first suppressing member 202 in the direction parallel to the emission surface may be equal to or larger than the size of the emission surface.

Reflection characteristics (reflectivity) of the bottom surface and the side surfaces of the depressed portion may be adjusted individually so that a brightness unevenness or a color unevenness of the light emitted from the light source apparatus is suppressed further. A member that forms the bottom surface of the depressed portion and a member that forms the side surfaces of the depressed portion may be different.

The conversion member 203 is provided on a side closer to the emission surface than the plurality of light sources 201 and the first suppressing member 202. The conversion member 203 converts the color of the light emitted from the plurality of light sources 201 and emits light of the converted color. In the present embodiment, the conversion member 203 has quantum dots as phosphors which are excited with the light emitted from the plurality of light sources 201. In the present embodiment, the blue light emitted from the plurality of light sources 201 is converted to light having a longer wavelength than that of the blue light by the phosphors. Thus, phosphors can be also referred to as "light-converting elements" or "wavelength-converting elements". In the present embodiment, an R phosphor which is a phosphor that converts blue light to red light and a G phosphor which is a phosphor that converts blue light to green light are used as the phosphors. The blue light from the plurality of light sources 201, the red light from the R phosphor, and the green light from the G phosphor are combined to form combined light which is emitted from the conversion member 203. In the present embodiment, the number (proportion) of R phosphors and G phosphors is adjusted so that white light is obtained as the combined light. In the example of FIG. 1, the conversion member 203 is a sheet-shaped member (quantum-dot sheet). Moreover, in the example of FIG. 1, the plurality of depressed portions of the first suppressing member 202 and the conversion member 203 form a plurality of closed spaces.

The conversion member may not have phosphors and the phosphors may not be quantum dots. Moreover, the conversion member may not be a sheet-shaped member. The structure and the shape of the conversion member are not particularly limited as long as the conversion member can convert the color of entering light to another color.

The light emitted from the conversion member 203 is not limited to white light. For example, the light emitted from the conversion member 203 may be red light, green light, blue light, cyan light, magenta light, yellow light, and the like.

Moreover, the light emitted from the phosphors is not limited to red light and green light. For example, the light emitted from the phosphors may be blue light, cyan light, magenta light, yellow light, and the like.

The second suppressing member 204 is provided on a side closer to the emission surface than the conversion member 203. The second suppressing member 204 suppresses, for each of a plurality of second divided regions that constitutes the region of the emission surface, spreading, in the direction parallel to the emission surface, of the light emitted from the conversion member 203 in the second divided region. Each of the second divided regions is a region includes (made up of) one or more first divided regions. In the present embodiment, for each of the plurality of second divided regions, the light emitted from the conversion member 203 in the second divided region is reflected, whereby spreading, in the direction parallel to the emission surface, of the light emitted from the conversion member 203 in the second divided region is suppressed. Specifically, the second suppressing member 204 has, for each of the plurality of second divided regions, a surface that follows the outline of the second divided region. For each of the plurality of second divided regions, the light emitted from the conversion member 203 in the second divided region is reflected from the surface that follows the outline of the second divided region. In the example of FIG. 1, the second suppressing member 204 holds the diffusing member 205 and the liquid-crystal panel 101 in the edge portion of the emission surface. Moreover, the second suppressing member 204 holds the diffusing member 205 on the inner side of the emission surface by making point-contact or line-contact with the diffusing member 205. In the present embodiment, the diffusing member 205 and the liquid-crystal panel 101 are held so that the conversion member 203, the diffusing member 205, and the liquid-crystal panel 101 are at desired gaps.

Figure 3:
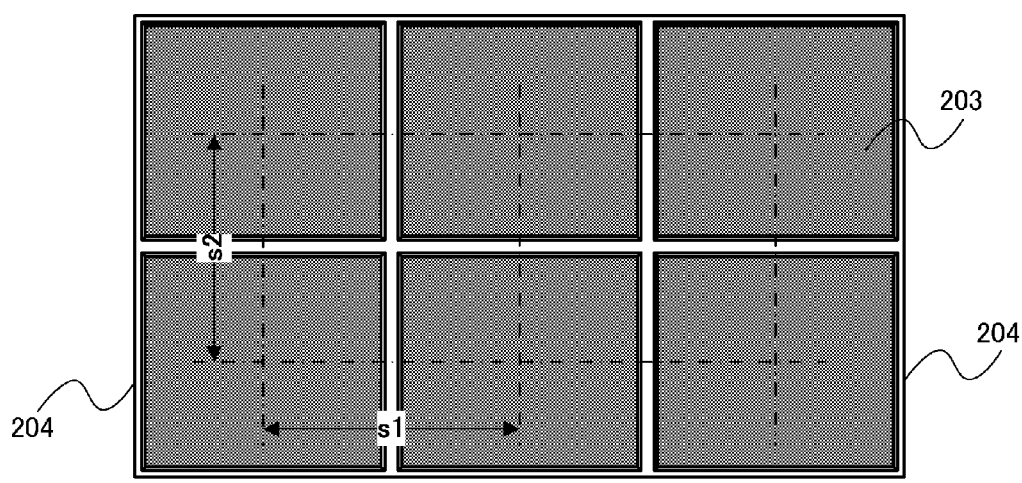
FIG. 3 is a top view illustrating a second suppressing member and a conversion member according to the first embodiment.

FIG. 3 is a top view when the second suppressing member 204 and the conversion member 203 are seen from the emission surface. In the example of FIG. 3, six regions of two rows by three columns similarly to the plurality of first divided regions of FIG. 2 are used as the plurality of second divided regions.

The reflection characteristics of the second suppressing member 204 may be the same as or different from the reflection characteristics of the first suppressing member 202.

The red light and green light generated by the conversion member 203 are emitted.

In the present embodiment, spreading, in the direction parallel to the emission surface, of the light emitted from the conversion member 203 is suppressed, whereby it is possible to suppress the leakage to another second divided region, of the red light or green light generated by the conversion member 203 in the second divided region. As a result, it is possible to suppress an unevenness (a brightness unevenness or a color unevenness of the light emitted from the light source apparatus) resulting from the leakage to another second divided region, of the red light or green light generated by the conversion member 203 in the second divided region. Moreover, light returning from the diffusing member 205 or the liquid-crystal panel 101 among the components of light emitted from the conversion member 203 in the second divided region can return to the conversion member 203 in the second divided region. The light returning from the liquid-crystal panel 101 returns to the conversion member 203 with the aid of the diffusing member 205.

The diffusing member 205 is provided on a side closer to the emission surface than the second suppressing member 204. The diffusing member 205 diffuses the light emitted from the conversion member 203. Due to this, it is possible to further suppress a brightness unevenness or a color unevenness of the light emitted from the light source apparatus. A diffuser plate, a diffusing sheet, a light-condensing sheet, a polarizing sheet, or the like, for example, can be used as the diffusing member 205. The diffusing member 205 may be made up of one member and may have a structure in which a plurality of members overlaps.

The light source apparatus may not include the diffusing member 205.

An arrangement of the light source 201, the conversion member 203, and the diffusing member 205 will be described in more detail.

The arrangement of the light sources 201 is preferably determined depending on the shape and the reflection characteristics of the first suppressing member 202. For example, when the side surfaces (reflecting walls) of the depressed portion of the first suppressing member 202 have uniform reflection characteristics and one light source 201 has one light-emitting element, it is preferable to arrange the light-emitting element at the center of a region surrounded by the side surfaces of the depressed portion. Moreover, when one light source 201 has two or more light-emitting elements, it is preferable to determine the arrangement of the two or more light-emitting elements so that a brightness unevenness or a color unevenness of the light emitted from the light source apparatus is suppressed further.

The arrangement of light-emitting elements may be determined based on calculations or experiments.

Moreover, the distance "h1" from the plurality of light sources 201 to the conversion member 203 is preferably determined so that a brightness unevenness or a color unevenness of the light emitted from the light source apparatus is suppressed further. For example, in the first divided region the distance "h1" is preferably determined so that the light emitted from the light source 201 uniformly enters the conversion member 203.

The distance "h1" may be determined based on calculations or experiments.

Figure 4:
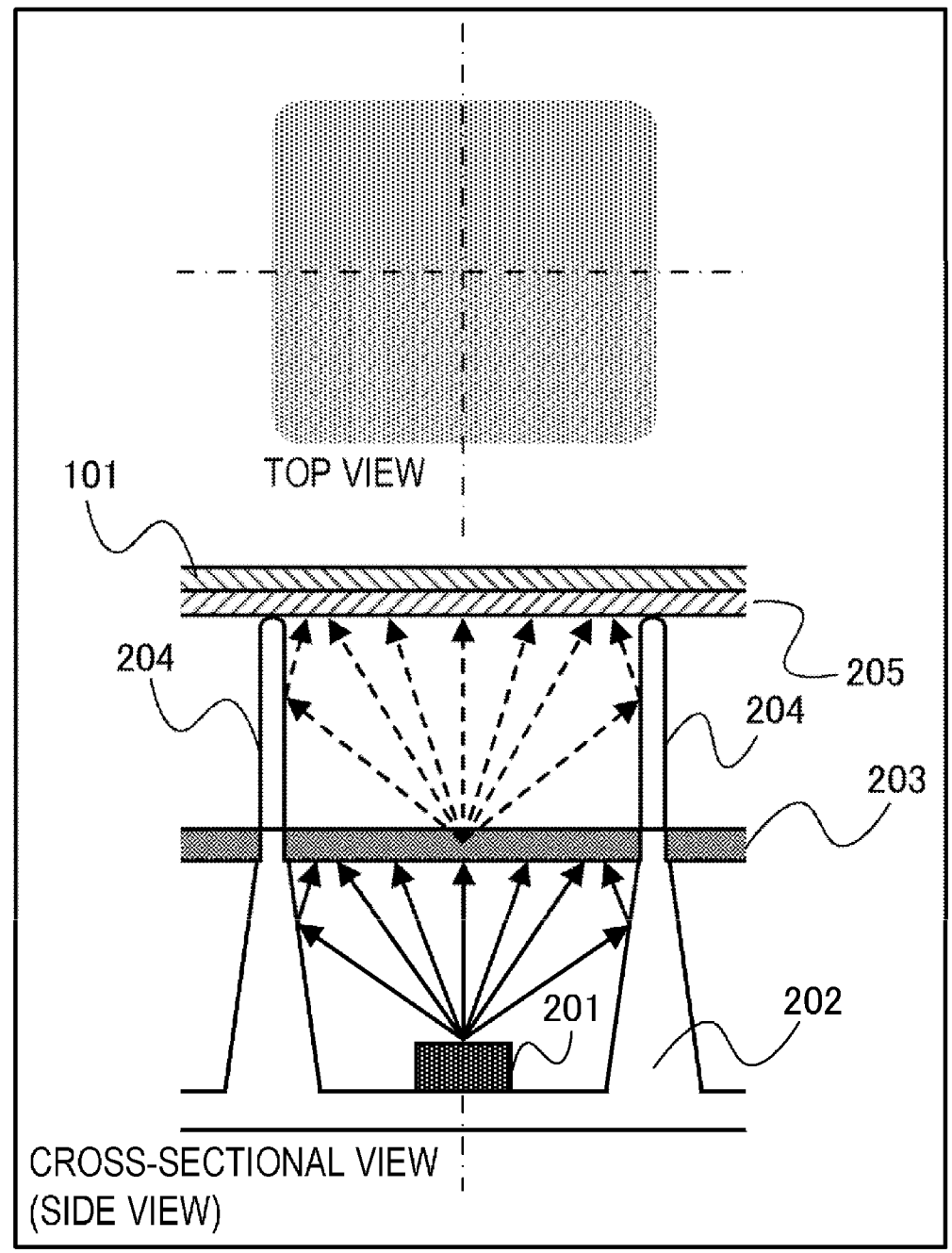
FIG. 4 is a diagram illustrating an example of a distribution of light emitted from a light source apparatus according to the first embodiment.

FIG. 4 illustrates the distribution of brightness and color of the light emitted from the light source apparatus in which the light source 201, the conversion member 203, and the diffusing member 205 are arranged at the positions determined according to the above-described method. In FIG. 4, sold-line arrows indicate the light emitted from the light source 201 and broken-line arrows indicate the light emitted from the conversion member 203.

As illustrated in FIG. 4, in the present embodiment, spreading, in the direction parallel to the emission surface, of the light emitted from the light source 201 is suppressed. Further, in the present embodiment, the light emitted from the light source 201 is reflected from the first suppressing member 202, whereby the light emitted from the light source 201 is sufficiently diffused and averaged. Due to this, it is possible to reduce a variation in the incidence angle of the light entering from the light source 201 to the conversion member 203. As a result, it is possible to suppress an unevenness (a brightness unevenness or a color unevenness of the light emitted from the light source apparatus) resulting from the variation in the incidence angle of the light entering from the light source 201 to the conversion member 203.

Moreover, as illustrated in FIG. 4, in the present embodiment, spreading, in the direction parallel to the emission surface, of the light emitted from the conversion member 203 is suppressed. Due to this, it is possible to suppress the leakage to another second divided region, of the red light or the green light generated by the conversion member 203 in the second divided region. As a result, it is possible to suppress an unevenness (a brightness unevenness or a color unevenness of the light emitted from the light source apparatus) resulting from the leakage to another second divided region, of the red light or green light generated by the conversion member 203 in the second divided region. Further, in the present embodiment, the light emitted from the conversion member 203 is reflected from the second suppressing member 204, whereby the light emitted from the conversion member 203 is sufficiently diffused and averaged. Due to this, it is possible to further suppress a brightness unevenness or a color unevenness of the light emitted from the light source apparatus.

Figure 5:
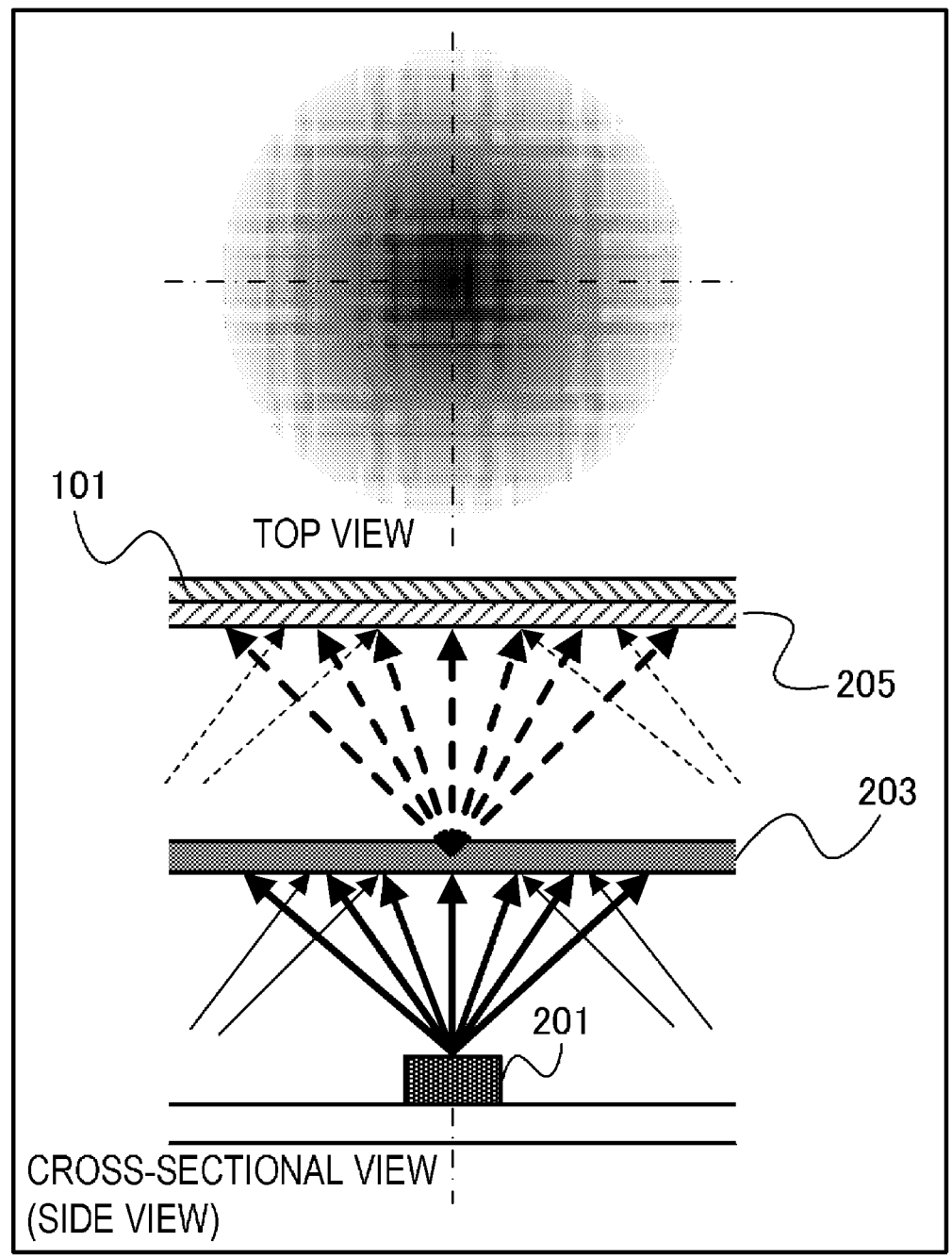
FIG. 5 is a diagram illustrating an example of a distribution of light emitted from a conventional light source apparatus.

FIG. 5 illustrates the brightness and the color distribution of the light emitted from the conventional light source apparatus which does not use the first suppressing member 202 or the second suppressing member 204. In FIG. 5, solid-line arrows indicate the light emitted from the light source 201 and broken-line arrows indicate the light emitted from the conversion member 203. Narrow broken-line arrows indicate the light leaking from second divided regions different from the light indicated by the bold broken-line arrows.

When the first suppressing member 202 is not used, as illustrated in FIG. 5, the light emitted from the light source 201 enters the conversion member 203 at various incidence angles. Moreover, when the second suppressing member 204 is not used, as illustrated in FIG. 5, the red light or the green light generated by the conversion member 203 in the second divided region leaks to other second divided regions. As a result, as illustrated in FIG. 5, a large unevenness (brightness unevenness or color unevenness) occurs in the light emitted from the light source apparatus.

As described above, according to the present embodiment, by using the first suppressing member 202 and the second suppressing member 204, it is possible to further suppress a brightness unevenness or a color unevenness of the light emitted from the light source apparatus having the conversion member that converts the color of the light emitted from a plurality of light sources.

The distance (a predetermined distance) from the conversion member 203 to the diffusing member 205 is preferably equal to or smaller than the distance from the plurality of light sources 201 to the conversion member 203. That is, it is preferable to satisfy Conditional Expression 1 below. "h2" is the distance from the conversion member 203 to the diffusing member 205 and "h1" is the distance from the plurality of light sources 201 to the conversion member 203.

$$h2 \geq h1 \qquad \text{(Expression 1)}$$

Moreover, the distance "h1+h2" from the plurality of light sources 201 to the diffusing member 205 is preferably approximately the same as the longer distance among a distance "s1" between adjacent light sources in the row direction and a distance "s2" between adjacent light sources in the column direction. When the distance "s1" between adjacent light sources in the row direction is the same as the distance "s2" between adjacent light sources in the column direction, the distance "h1+h2" is preferably approximately the same as the distance "s1" and the distance "s2". That is, it is preferable to satisfy Conditional Expressions 2-1 to 2-3 below.

If $s1>s2$, then $h1+h2 \simeq s1$ (Expression 2-1)

If $s1<s2$, then $h1+h2 \simeq s2$ (Expression 2-2)

If $s1=s2$ then $h1+h2 \simeq s1$ (and $s2$) (Expression 2-3)

Further, it is more preferable to determine a reference value for the distance "h1+h2" (or the distance "h2") by taking the conditional expressions into consideration and to determine the distance "h1+h2" (or the distance "h2") by adjusting the determined reference value. The determined reference value is preferably adjusted so that a brightness unevenness or a color unevenness of the light emitted from the light source apparatus is suppressed further. Moreover, the reference value is preferably adjusted so that the contrast of the light emitted from the light source apparatus is improved further when local dimming control of controlling the emission brightness of the light source in respective divided regions is executed. In local dimming control, for example, the emission brightness of a light source provided in each of a plurality of divided regions is controlled based on a characteristic amount (brightness) of image data to be displayed in the divided region. The divided region which is the unit of control of the emission brightness in the local dimming control may be the same region as the first divided region or the second divided region and may be a region different from the first divided region and the second divided region. This all being said, from the perspective of suppressing an unevenness (a brightness unevenness or a color unevenness of light emitted from the light source apparatus) during execution of local dimming control, it is preferable that the divided region which is the unit of control of the emission brightness in the local dimming control is the same as the second divided region.

The reference value may be adjusted based on calculation results or experiment results.

The relation between the distance "h1" and the distance "h2" may be determined by taking directivity of the light source 201, the reflection characteristics of the first suppressing member 202, the conversion characteristics of the conversion member 203, the reflection characteristics of the second suppressing member 204, the diffusion characteristics of the diffusing member 205, and the like into consideration.

Figure 6A:
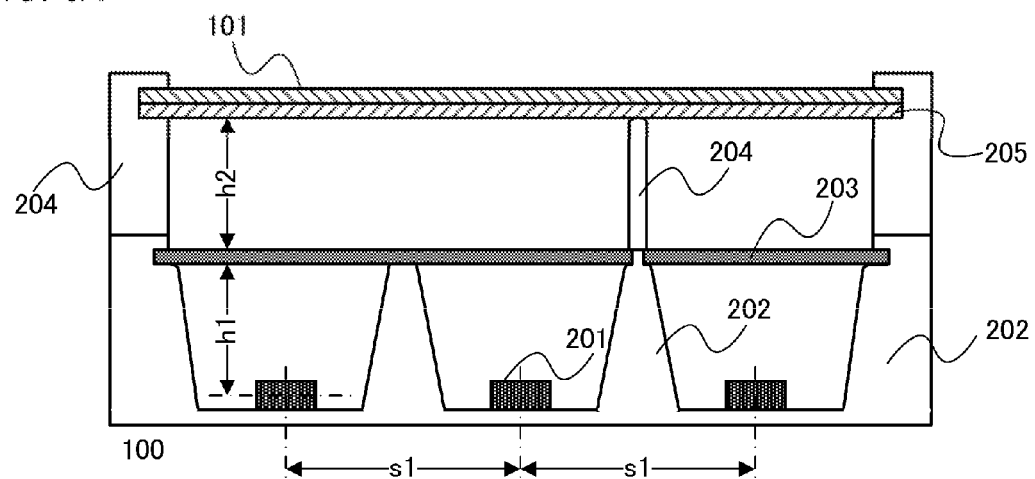
FIGS. 6A and 6B are diagrams illustrating an example of a configuration of the liquid-crystal display apparatus according to the first embodiment.
Figure 6B:
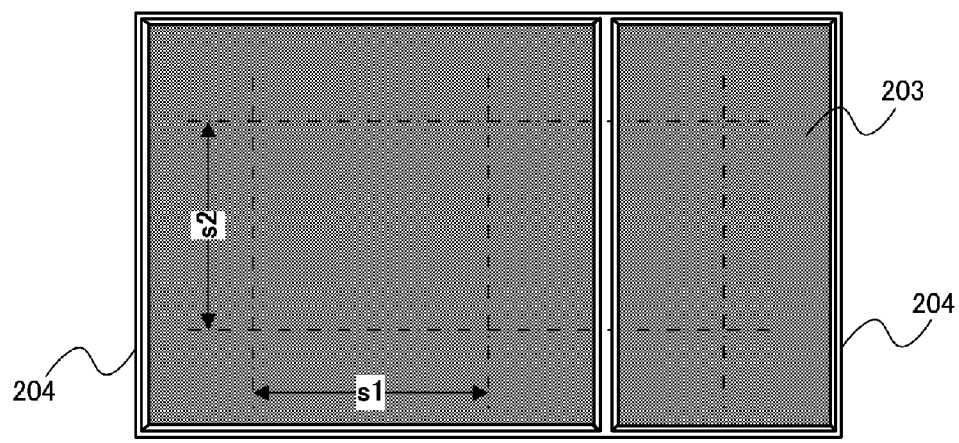

In the present embodiment, although an example where the second divided region is the same as the first divided region has been described, the present invention is not limited to this. For example, the second divided region may be a region made up of a plurality of first divided regions. FIGS. 6A and 6B illustrate an example in which the second divided region is made up of a plurality of first divided regions. FIG. 6A is a cross-sectional view (a cross-sectional view taken along a plane vertical to the screen of the liquid-crystal display apparatus) of the liquid-crystal display apparatus and FIG. 6B is a top view when the second suppressing member 204 and the conversion member 203 are seen from the emission surface. In this example, it is assumed that six first divided regions of two rows by three columns similarly to those of FIG. 2 are used as the plurality of first divided regions. In the example of FIGS. 6A and 6B, two second divided regions including a second divided region made up of four first divided regions of two rows by two columns and a second divided region made up of two first divided regions of two rows by one column are used. By using a large-size region as the second divided region, it is possible to further suppress an unevenness (a brightness unevenness or a color unevenness of light emitted from the light source apparatus) occurring when there is a variation in the emission brightness between light sources 201. However, the use of the smaller second divided region enables the contrast of the light emitted from the light source apparatus during execution of local dimming control to be better improved than the use of the larger second divided region.

Figure 7A:
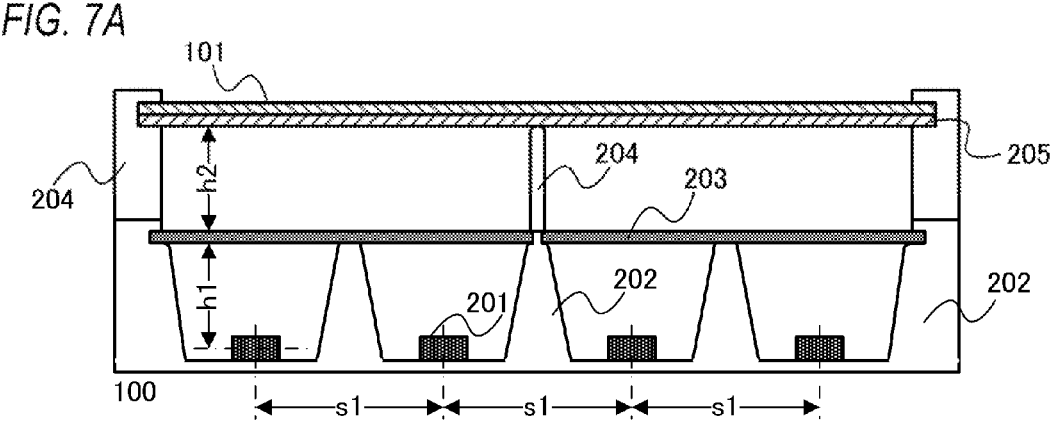
FIGS. 7A and 7B are diagrams illustrating an example of a configuration of the liquid-crystal display apparatus according to the first embodiment.
Figure 7B:
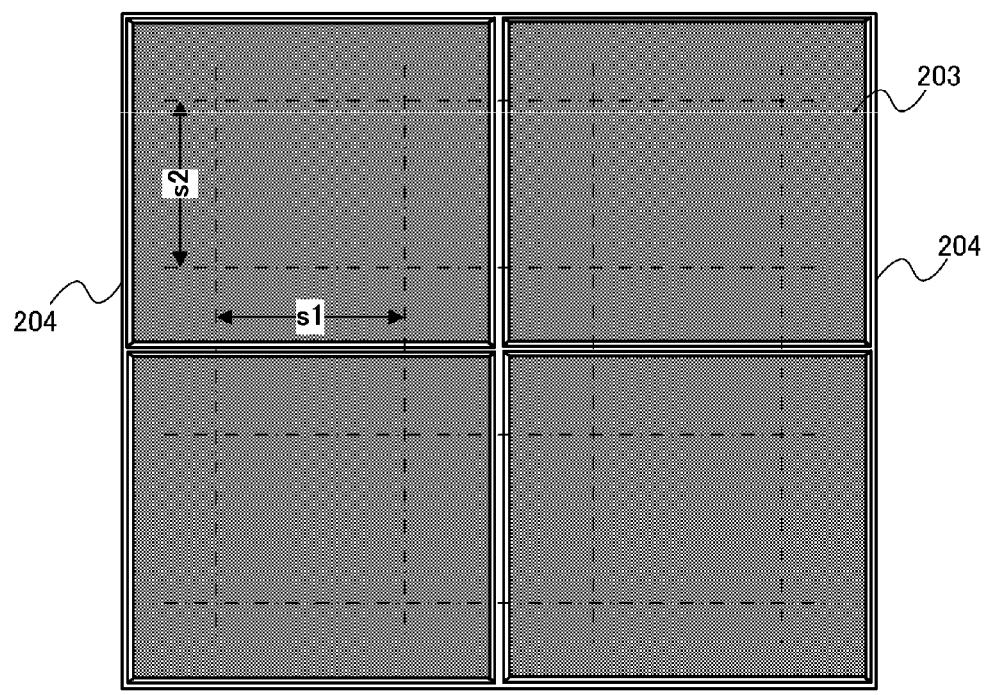

A plurality of regions having the same size may be used as the plurality of second divided regions. FIGS. 7A and 7B illustrate an example in which a plurality of regions having the same size is used as the plurality of second divided regions and each of the second divided regions is made up of a plurality of first divided regions. FIG. 7A is a cross-sectional view (a cross-sectional view taken along a plane vertical to the screen of the liquid-crystal display apparatus) of the liquid-crystal display apparatus and FIG. 7B is a top view when the second suppressing member 204 and the conversion member 203 are seen from the emission surface. In this example, it is assumed that sixteen first divided regions of four rows by four columns are used as the plurality of first divided regions. In the example of FIGS. 7A and 7B, four second divided regions of two rows by two columns are used and each of the second divided regions is made up of four first divided regions of two rows by two columns.

In the present embodiment, although an example where the first suppressing member 202 reflects light has been described, the present invention is not limited to this. For example, the first suppressing member 202 may absorb light that enters the first suppressing member 202 among the components of light emitted from the light source 201 to thereby suppress spreading of the light emitted from the light source 201. The second suppressing member 204 may have a configuration (for example, a configuration of absorbing light) other than the configuration of reflecting light similarly to the first suppressing member 202. However, by using the light reflecting configuration, it is possible to improve the utilization efficiency of the light emitted from the light source 201 and to realize a light source apparatus that emits bright light with low power.

In the present embodiment, although an example where the first suppressing member 202 is in contact with the conversion member 203 and the depressed portion of the first suppressing member 202 and the conversion member 203 forms a closed space has been described, the present invention is not limited to this. The first suppressing member 202 may not be in contact with the conversion member 203, and the depressed portion of the first suppressing member 202 and the conversion member 203 may not form a closed space. However, the formation of a closed space by the conversion member 203 and the depressed portion of the first suppressing member 202 enables spreading of light to be suppressed better than when the closed space is not formed.

In the present embodiment, although an example where the first suppressing member 202 has a cylindrical surface (closed surface) that follows the first divided region has been described, the present invention is not limited to this. For example, the first suppressing member 202 may have a plurality of surfaces (obtained when the cylindrical surface that follows the outline of the first divided region is divided) that follows the outline of each of the first divided regions. The second suppressing member 204 may have a plurality of surfaces that follows the outline of each of the second divided regions similarly to the first suppressing member 202. However, the use of the cylindrical surface (closed surface) enables spreading of light to be suppressed better than the use of a plurality of surfaces.

Second Embodiment

Hereinafter, a light source apparatus and an image display apparatus according to a second embodiment of the present invention will be described. In the present embodiment, an example in which the light source apparatus further includes a holding member that holds the diffusing member will be described.

Figure 8:
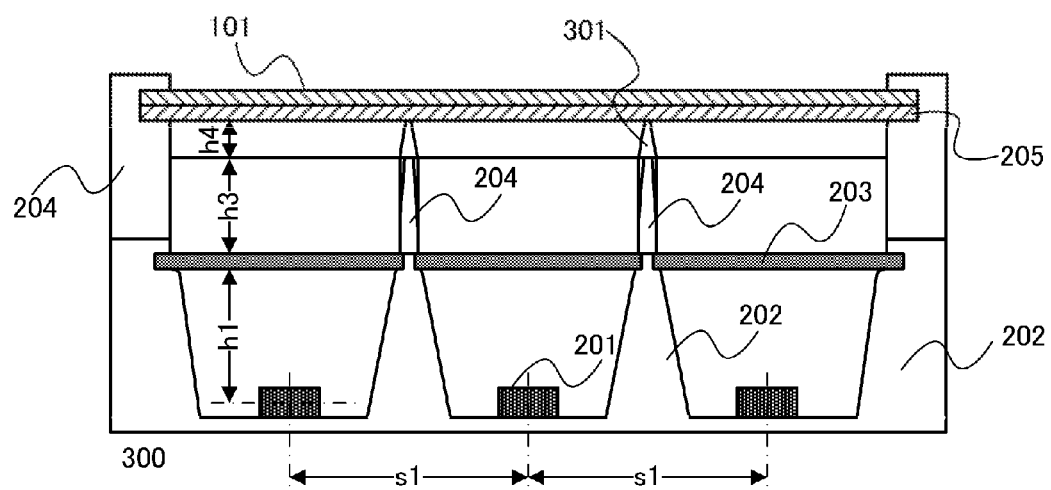
FIG. 8 is a diagram illustrating an example of a configuration of a liquid-crystal display apparatus according to a second embodiment.

FIG. 8 is a cross-sectional view illustrating an example of a configuration of a liquid-crystal display apparatus 300 according to the present embodiment. FIG. 8 is a cross-sectional view taken along a plane vertical to the screen of the liquid-crystal display apparatus 300.

In FIG. 8, the same members as those of the first embodiment (FIG. 1) are denoted by the same reference numerals as those of FIG. 1 and description thereof will not be provided.

Figure 9:
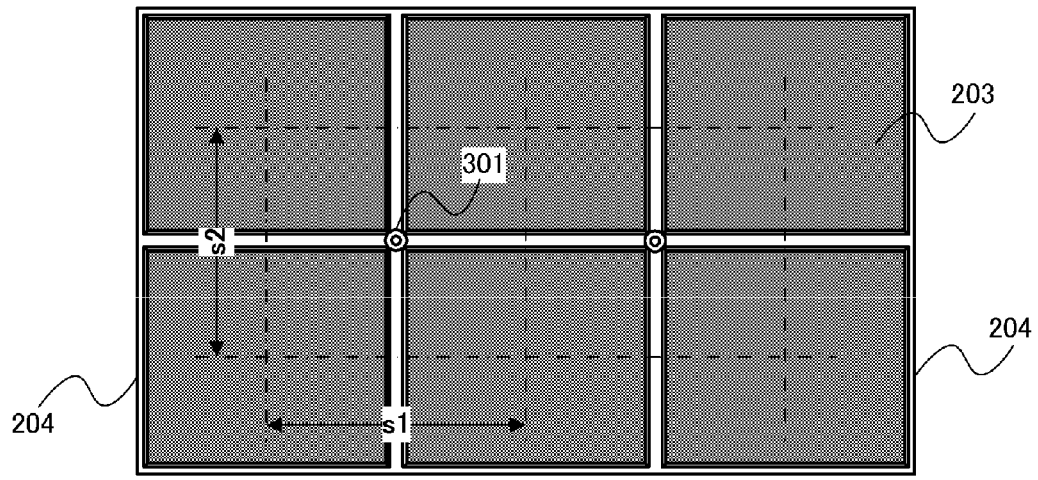
FIG. 9 is a top view illustrating an example of a holding member and the like according to the second embodiment.

As illustrated in FIG. 8, the light source apparatus according to the present embodiment further includes a holding member 301. FIG. 9 illustrates a top view when the holding member 301, the second suppressing member 204, and the conversion member 203 are seen from the emission surface.

The holding member 301 is provided between the second suppressing member 204 and the diffusing member 205. The holding member 301 makes point-contact with the diffusing member 205 and holds the diffusing member 205 with the point-contacts. By holding the diffusing member 205 with the point-contacts, it is possible to minimize the influence of the holding member 301 on the distribution of brightness or color of the light emitted from the light source apparatus and to maintain the positional relation between the diffusing member 205 and other members. A height "h3" of the second suppressing member 204 and a height "h4" of the holding member 301 are preferably determined so that an unevenness of the light emitted from the light source apparatus is suppressed further.

As described above, according to the present embodiment, the holding member 301 that holds the diffusing member 205 with point-contacts is further used. Due to this, it is possible to minimize the influence of the holding member 301 on the distribution of brightness or color of the light emitted from the light source apparatus and to maintain the positional relation between the diffusing member 205 and other members.

Third Embodiment

Hereinafter, a light source apparatus and an image display apparatus according to a third embodiment of the present invention will be described. In the present embodiment, an example in which only the first divided region is used as the divided region and a sheet (a member having a sheet structure) is used as the conversion member will be described. "A case where the first divided region only is used as the divided region" means, for example, "a case where the second suppressing member is not used but only the first suppressing member is used". In the present embodiment, a slit is formed in the conversion member. Specifically, the slit is formed at the boundary (a boundary portion) between the first divided regions.

Figure 11:
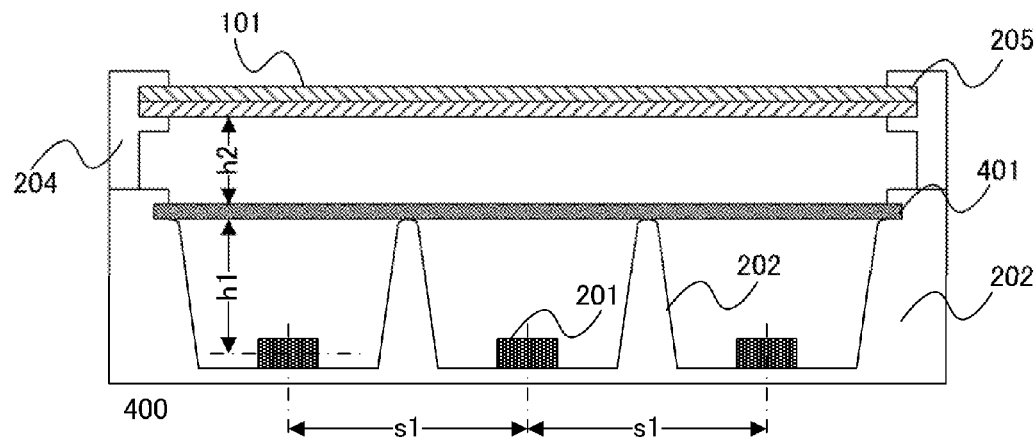
FIG. 11 is a cross-sectional view illustrating an example of a configuration of a liquid-crystal display apparatus according to a third embodiment.

FIG. 11 is a cross-sectional view illustrating an example of a configuration of a liquid-crystal display apparatus 400 according to the present embodiment. FIG. 11 is a cross-sectional view taken along a plane vertical to the screen of the liquid-crystal display apparatus 400.

In FIG. 11, the same members as those of the first embodiment (FIG. 1) are denoted by the same reference numerals as those of FIG. 1 and description thereof will not be provided.

Figure 12:
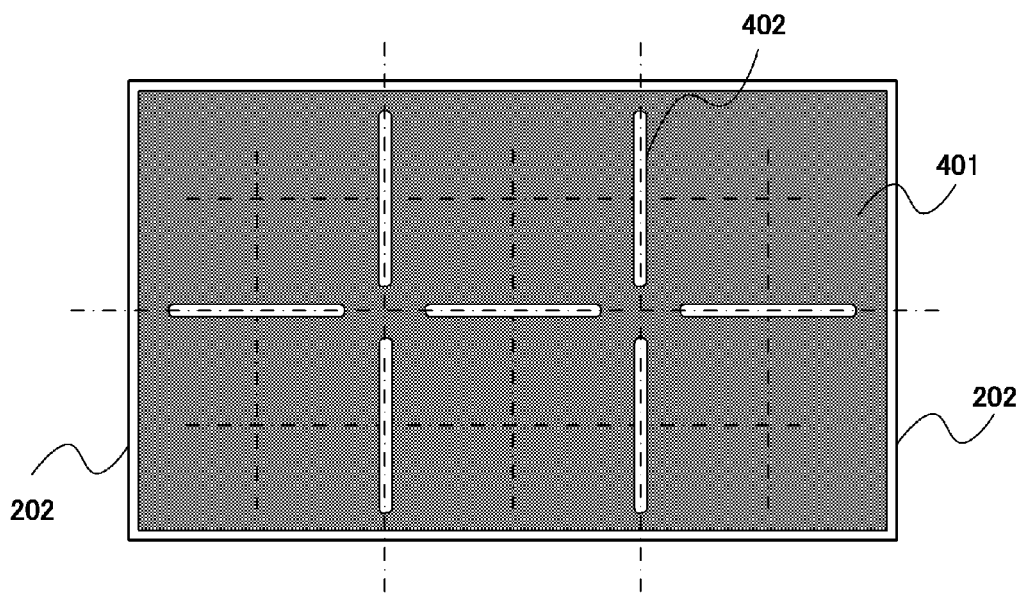
FIG. 12 is atop view illustrating a conversion member according to the third embodiment.

FIG. 12 is a top view when a conversion member 401 of the liquid-crystal display apparatus 400 according to the present embodiment is seen from the emission surface. In the example of FIG. 12, the same six regions of two rows by three columns as the plurality of first divided regions of FIG. 2 are used.

Here, a case where the conversion member 401 is a quantum-dot sheet will be considered. Light entering the quantum dots in the conversion member 401 is radiated in the direction of 360° after the wavelength thereof is converted by the quantum dots. Due to this, when the light source in the divided region is unlit according to the brightness control such as local dimming control and the conversion member 401 is constituted as one uniform sheet, light in the lit region propagates through the conversion member 401 and leaks to an unlit region (a divided region in which the light source is unlit). Due to such leakage of light, the contrast improvement effect of the local dimming control may be diminished.

Therefore, in the present embodiment, as illustrated in FIG. 12, a perforation-like slit is formed in the conversion member 401 which is one sheet. Specifically, the perforation-like slit is formed at the boundary between the first divided regions. By forming a slit 402 in the conversion member 401, it is possible to suppress propagation of light between the first divided regions even when only the first divided region is used as the divided region. The dimensions, shape, and number of slits in the conversion member 401 are preferably determined so that leakage of light is suppressed further by taking such constraints as to prevent deflection or deformation of the conversion member 401 into consideration. Moreover, the slit may not have a perforation shape.

Figure 13:
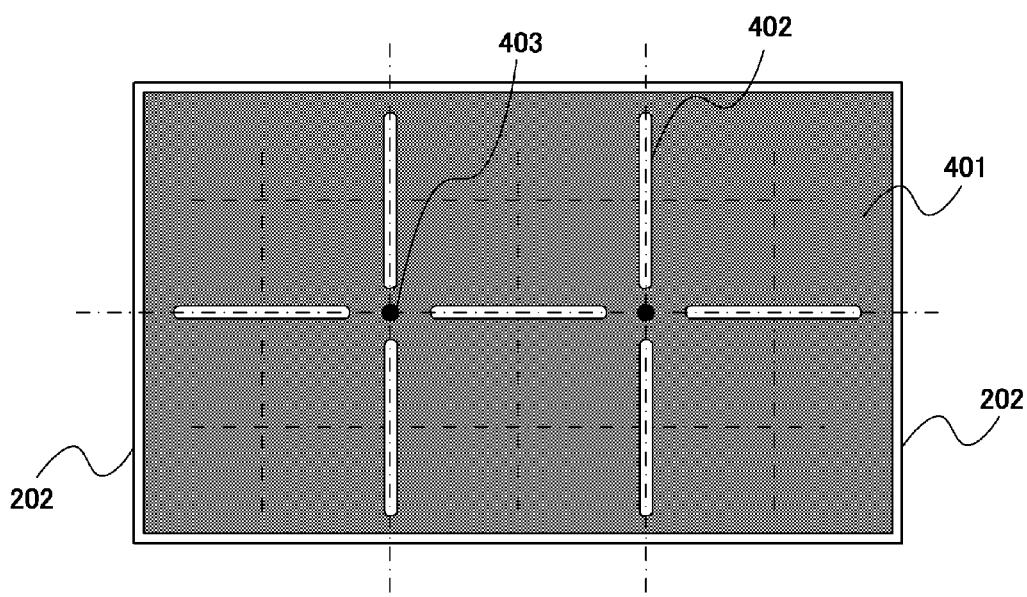
FIG. 13 is atop view illustrating a conversion member according to the third embodiment.

Moreover, as illustrated in FIG. 13, a fixing portion 403 that fixes the conversion member 401 to the first suppressing member 202 may be provided in a portion where the first suppressing member 202 and the conversion member 401 are in contact with each other. In the fixing portion 403, the conversion member 401 is fixed to the first suppressing member 202, for example, by an adhesive, a screw, a rivet, or the like.

As described above, according to the present embodiment, the slit is formed in the conversion member. Specifically, the slit is formed at the boundary between the first divided regions. Due to this, even when only the first divided region is used as the divided region, it is possible to suppress the leakage of light between the first divided regions and to enhance the contrast improvement effect of the local dimming control.

The configurations of the first to third embodiments are examples only, and the present invention is not limited to these configurations. A configuration in which the configurations of the first to third embodiments are modified and changed in various ways also falls within the scope of the present invention.

Figure 10:
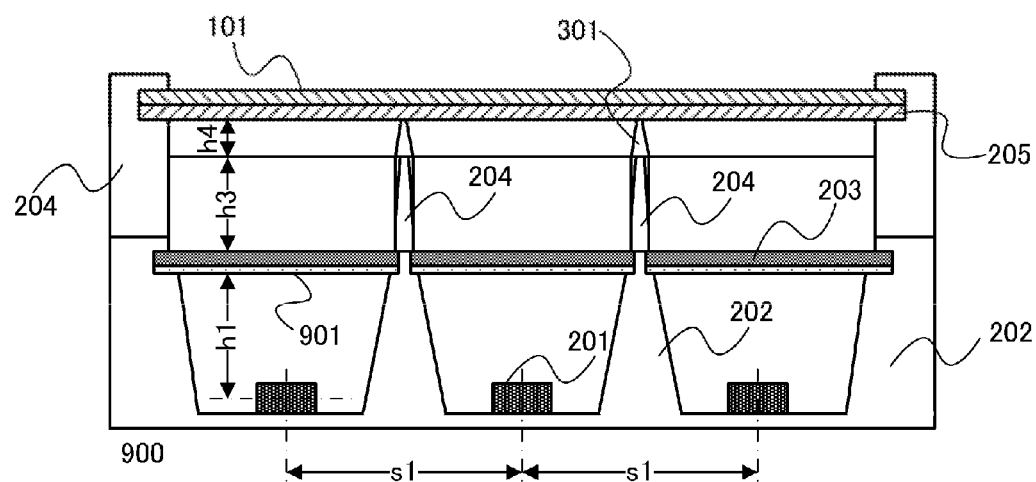
FIG. 10 is a diagram illustrating a modification of a liquid-crystal display apparatus according to the second embodiment.

For example, as illustrated in FIG. 10, the light source apparatus may further include a light-condensing member 901. FIG. 10 is a cross-sectional view of a liquid-crystal display apparatus 900. A light-condensing member 901 is provided between the conversion member 203 and the plurality of light sources 201 and the first suppressing member 202. The light-condensing member 901 condenses the light emitted from the plurality of light sources 201 toward the conversion member 203. In the example of FIG. 10, although the light-condensing member 901 is a sheet-shaped member (light-condensing sheet), the light-condensing member 901 may not be a sheet-shaped member. The use of the light-condensing member 901 enables the light (the light emitted from the light source 201) to enter the conversion member 203 more uniformly.

In the example of FIG. 10, although the light source apparatus includes the holding member 301, the light-condensing member may be provided in the light source apparatus of the first embodiment, which does not have the holding member 301.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-087433, filed on Apr. 21, 2014, and Japanese Patent Application No. 2015-028661, filed on Feb. 17, 2015, which are hereby incorporated by reference herein in their entirety.

What is claimed is:

1. A light source apparatus that emits light from an emission surface, comprising:
  a plurality of light sources provided, respectively, in a plurality of first divided regions of the emission surface;
  a first suppressing member that suppresses, for each of the plurality of first divided regions, spreading, in a direction parallel to the emission surface, of light emitted from a light source provided in the first divided region;
  a conversion member that is provided on a side closer to the emission surface than the plurality of light sources and the first suppressing member so as to convert the color of the light emitted from the plurality of light sources and emit light of the converted color;
  a second suppressing member that suppresses, for each of a plurality of second divided regions of the emission surface, spreading, in the direction parallel to the emission surface, of the light emitted from the conversion member in the second divided regions; and
  a diffusing member that is provided on a side closer to the emission surface than the second suppressing member so as to diffuse the light emitted from the conversion member,
  wherein the second divided region includes two or more first divided regions, and
  the second suppressing member is located between the conversion member and the diffusing member.

2. The light source apparatus according to claim 1, wherein the second suppressing member suppresses, for each of the plurality of second divided regions, spreading, in the direction parallel to the emission surface, of the light emitted from the conversion member in the second divided region by reflecting the light emitted from the conversion member in the second divided region.

3. The light source apparatus according to claim 1, wherein the second suppressing member has, for each of the plurality of second divided regions, a surface that follows an outline of the second divided region.

4. The light source apparatus according to claim 1, wherein the first suppressing member suppresses, for each of the plurality of first divided regions, spreading, in the direction parallel to the emission surface, of the light emitted from the light source provided in the first divided regions by reflecting the light emitted from the light source provided in the first divided region.

5. The light source apparatus according to claim 1, wherein the first suppressing member has, for each of the plurality of first divided regions, a surface that follows an outline of the first divided region.

6. The light source apparatus according to claim 1, wherein
  the first suppressing member has a plurality of depressed portions corresponding to the plurality of first divided regions, respectively, and
  the plurality of light sources are provided in the plurality of depressed portions, respectively.

7. The light source apparatus according to claim 6, wherein the plurality of depressed portions and the conversion member form a plurality of closed spaces.

8. The light source apparatus according to claim 1, wherein a distance from the conversion member to the diffusing member is equal to or smaller than a distance from the plurality of light sources to the conversion member.

9. The light source apparatus according to claim 1, wherein
  the plurality of light sources are disposed in a matrix form, and
  the distance from the plurality of light sources to the diffusing member is approximately the same as a longer distance of a distance between the light sources adjacent in a row direction and a distance between the light sources adjacent in a column direction.

10. The light source apparatus according to claim 1, further comprising:
  a holding member that is provided between the conversion member and the diffusing member so as to hold the diffusing member with point-contacts.

11. The light source apparatus according to claim 1, further comprising:
  a light-condensing member that is provided between the conversion member, and the plurality of light sources and the first suppressing member so as to condense the light emitted from the plurality of light sources toward the conversion member.

12. The light source apparatus according to claim 1, wherein the conversion member has phosphors.

13. The light source apparatus according to claim 12, wherein the phosphors are quantum dots.

14. The light source apparatus according to claim 1, wherein the conversion member is a sheet-shaped member.

15. An image display apparatus comprising:
  the light source apparatus according to claim 1; and
  a display unit that displays an image on a screen by transmitting light from the light source apparatus.

16. A light source apparatus that emits light from an emission surface, comprising:
  a plurality of light sources provided, respectively, in a plurality of first divided regions of the emission surface;
  a first suppressing member that suppresses, for each of the plurality of first divided regions, spreading, in a direction parallel to the emission surface, of light emitted from a light source provided in the first divided region;

a conversion member that is provided on a side closer to the emission surface than the plurality of light sources and the first suppressing member so as to convert the color of the light emitted from the plurality of light sources and emit light of the converted color; and a diffusing member that is provided on a side closer to the emission surface than the conversion member so as to diffuse the light emitted from the conversion member, wherein the first suppressing member supports the conversion member at a portion corresponding to an outline of the first divided region, and the conversion member has a slit formed at the portion corresponding to the outline of the first divided region, and wherein the slit is formed at a boundary portion between one of the plurality of first divided regions and others of the plurality of first divided regions.

17. A light source apparatus that emits light from an emission surface, comprising:

a plurality of light sources provided, respectively, in a plurality of first divided regions of the emission surface;

a first suppressing member that suppresses, for each of the plurality of first divided regions, spreading, in a direction parallel to the emission surface, of light emitted from a light source provided in the first divided region;

a conversion member that is provided on a side closer to the emission surface than the plurality of light sources and the first suppressing member so as to convert the color of the light emitted from the plurality of light sources and emit light of the converted color; and a diffusing member that is provided on a side closer to the emission surface than the conversion member so as to diffuse the light emitted from the conversion member, wherein the first suppressing member supports the conversion member at a portion corresponding to an outline of the first divided region, and the conversion member has a slit formed at the portion corresponding to the outline of the first divided region, and wherein the first divided region is a square region, and the slit includes four sub-slits, each of that is disposed on each of four sides of each of the plurality of first divided regions.

* * * * *